United States Patent

[11] 3,611,304

[72] Inventor Goran Anders Henrik Hemdal
Tyreso, Sweden
[21] Appl. No. 787,816
[22] Filed Dec. 30, 1968
[45] Patented Oct. 5, 1971
[73] Assignee Telefonaktiebolaget LM Ericsson
Stockholm, Sweden
[32] Priority Feb. 7, 1968, June 17, 1968
[33] Sweden
[31] 1574/68 and 8142/68

[54] ADDRESS CONVERSION METHOD FOR USE IN SCANNING INPUTS TO A PROCESS CONTROL COMPUTER
7 Claims, 10 Drawing Figs.

[52] U.S. Cl. .......... 340/172.5
[51] Int. Cl. .......... G06f 9/20
[50] Field of Search .......... 340/173, 172.5

[56] References Cited

UNITED STATES PATENTS

| | | | |
|---|---|---|---|
| 3,019,976 | 2/1962 | Taylor .......... | 340/172.5 |
| 3,226,684 | 12/1965 | Cox .......... | 340/172.5 |
| 3,380,030 | 4/1968 | McMahon .......... | 340/172.5 |
| 3,416,138 | 12/1968 | Brass .......... | 340/172.5 |
| 3,483,524 | 12/1969 | De Buck et al. .......... | 340/172.5 |

*Primary Examiner*—Raulfe B. Zache
*Attorney*—Hane & Baxley

ABSTRACT: In a computer-controlled system of cooperating devices for example a telecommunication system, the condition of each of the devices is indicated by a unit of binary information in a position in a first storage area in the data store, and the condition of a group of positions in the first storage area is indicated in a position in a second storage area, so that instead of for example scanning the positions in the first storage area to determine the condition of the corresponding device, a faster scan can be executed by scanning the positions in the second storage area.

Figure 1:
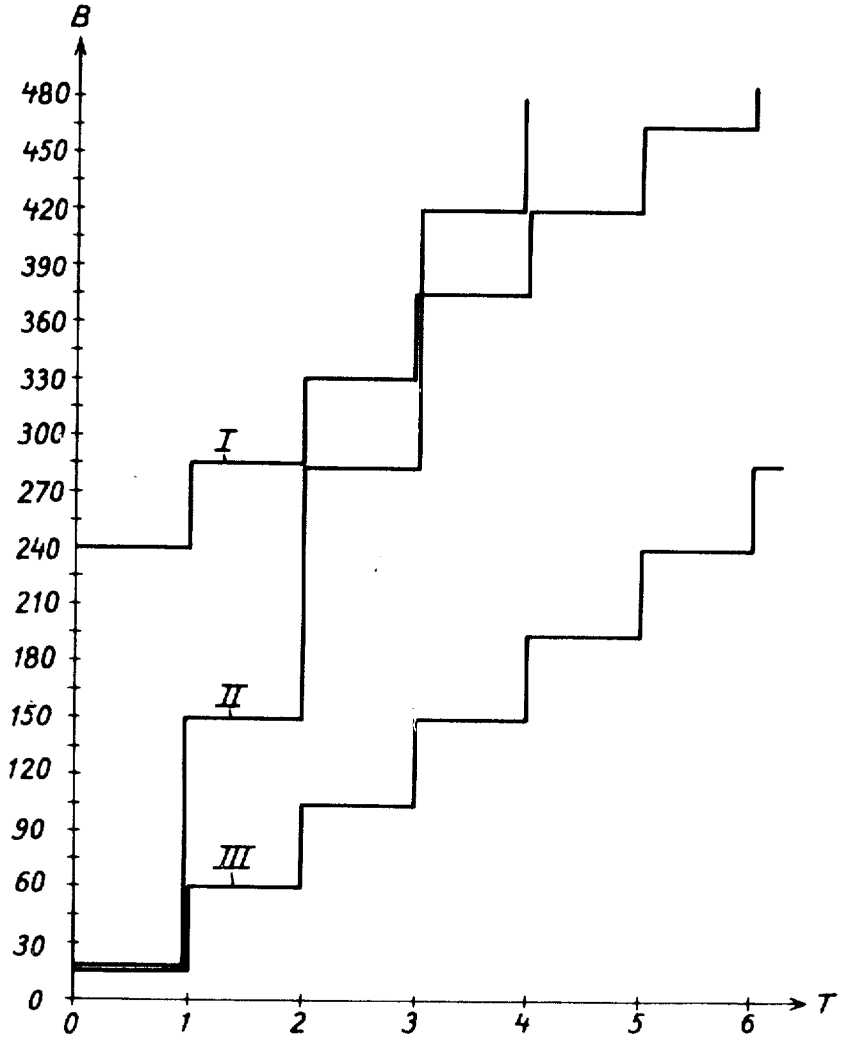

INVENTOR
GÖRAN ANDERS HENRIK HEMDAL
BY Hane and Baxley
ATTORNEYS

INVENTOR

Göran Anders Henrik Hemdal

BY Hane and Baxley

ATTORNEYS

INVENTOR

GÖRAN ANDERS HENRIK HEMDAL

BY Hane and Baxley

ATTORNEYS

INVENTOR

Göran Anders Henrik Hemdal

BY Hane and Baxley

ATTORNEYS

INVENTOR

Göran Anders Henrik Hemdal

BY Hane and Baxley

ATTORNEYS

INVENTOR

GÖRAN ANDERS HENRIK HEMDAL

BY Hane and Baxley

ATTORNEYS

INVENTOR

GÖRAN ANDERS HENRIK HEMDAL

BY Hane and Bayley

ATTORNEYS

INVENTOR

GÖRAN ANDERS HENRIK HEMDAL

BY Hane and Baxley

ATTORNEYS

ADDRESS CONVERSION METHOD FOR USE IN SCANNING INPUTS TO A PROCESS CONTROL COMPUTER

The invention relates to a method for decreasing the work in a computer operating in real time and carrying out scanning and controlling functions concerning different devices, for example connecting devices in a telecommunication system. The condition of the different devices is indicated in the form of binary information in a storage area and the computer carries out predetermined functions concerning the device, which initiated the respective indication.

The workload of the computer can be divided into two parts, a traffic-independent part and a traffic-dependent part. The traffic-independent part of the work consists to a large extent of scanning programs whose total need of time is dependent on the number of means to be scanned. The traffic-dependent part of the work consists of executing programs, whose total need of time will be proportional to the traffic intensity. Assume that, in a position in a storage area in a computer, the condition of a device is represented by a binary information unit. The scanning of the positions may be carried out in different ways. One way is to scan in cyclic order all the positions and, in case a change in comparison with the previous scan is discovered in a position, switch in an executing program after which the scanning continues. Said method causes the traffic-independent work to become comparatively large, since each position in the storage area has to be scanned, the condition of some of the positions may have changed or not. One way to decrease the traffic-independent work is to group the binary positions, indicating the condition of the respective devices, into binary words, and to scan the positions of said binary words not one by one, but to use a secondary storage area in which each of the positions represents one of said binary words. Thus a change in a position in the secondary storage area indicates that at least one change has occurred in the corresponding word in the primary area. If a position in the secondary area indicates that no change in the corresponding word in the primary area has occurred, a further scanning of the word in the primary area is not necessary. It is easy to understand that due to this, a considerable decrease of the traffic-independent work is achieved, since, for example, for 16-bit binary words, the work decreases to a sixteenth. However, the traffic-dependent-part of the work will increase, since upon scanning the secondary storage area and encountering a change in a position, an address calculation has to be made to the corresponding word in the primary storage area, after which the word in the primary storage area has to be scanned, position after position, in order to identify the means causing the change. After carrying out a change in a position in a word in the primary storage area, an address calculation has to be made in order to carry out a corresponding change in the position in the secondary area belonging to said word in the primary area. As a consequence of this the traffic-dependent-part of the work becomes larger than in the first-mentioned case, so that despite the low traffic-independent work, the total work of the computer will, even at a low traffic intensity, exceed the work in the case when no secondary storage area was used.

The object of the invention is to eliminate the inconveniences mentioned and to reduce the traffic-independent work while the traffic-dependent work is kept within reasonable limits. The invention is characterized by the appended claims.

An example in accordance with the invention will be described with reference to the accompanying drawing, in which FIG. 1 shows a diagram with a comparison between the work in a computer when different methods are used for scanning the condition of different means and selecting means in a telecommunication system.

Figure 2A:
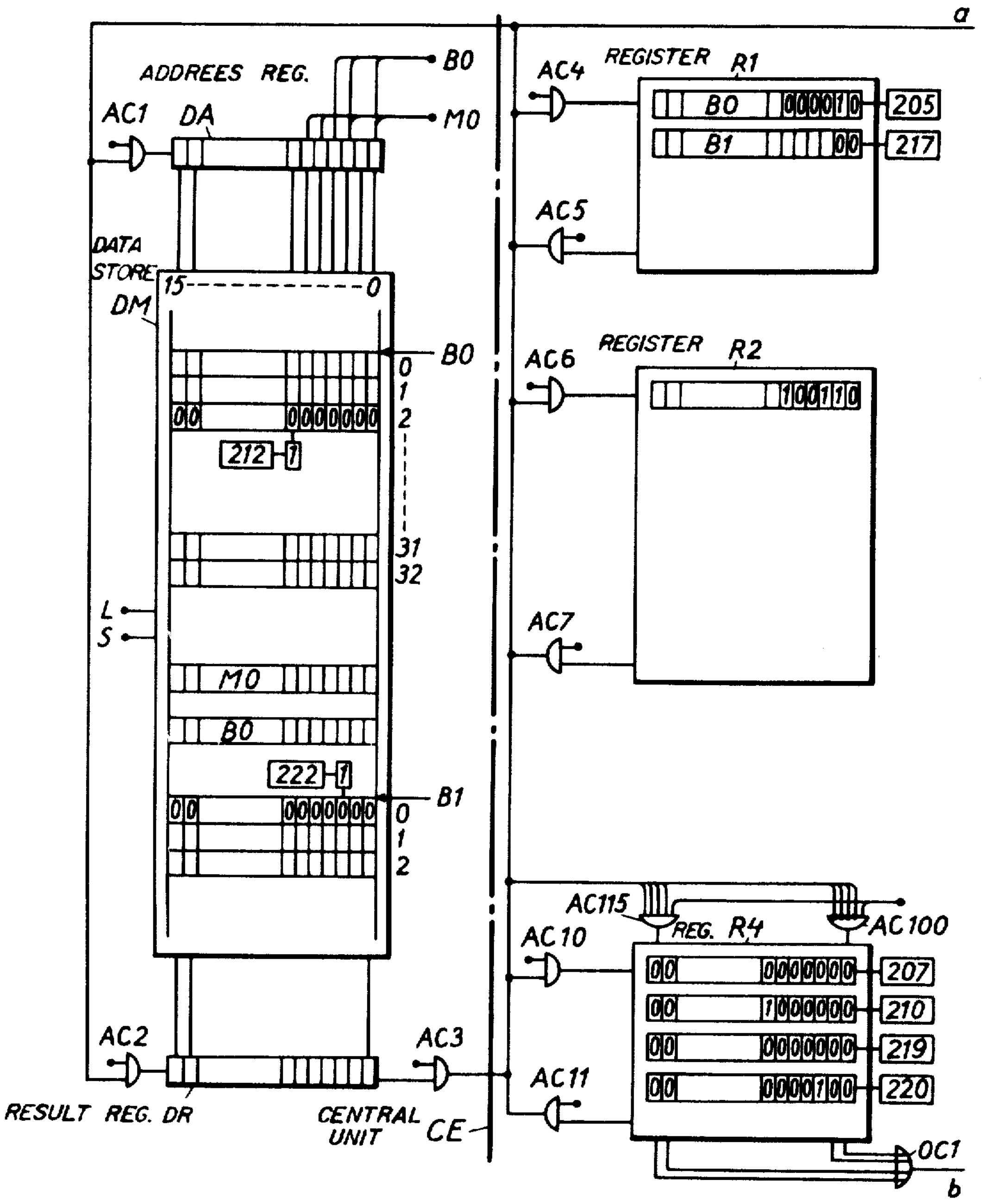
Figure 2B:
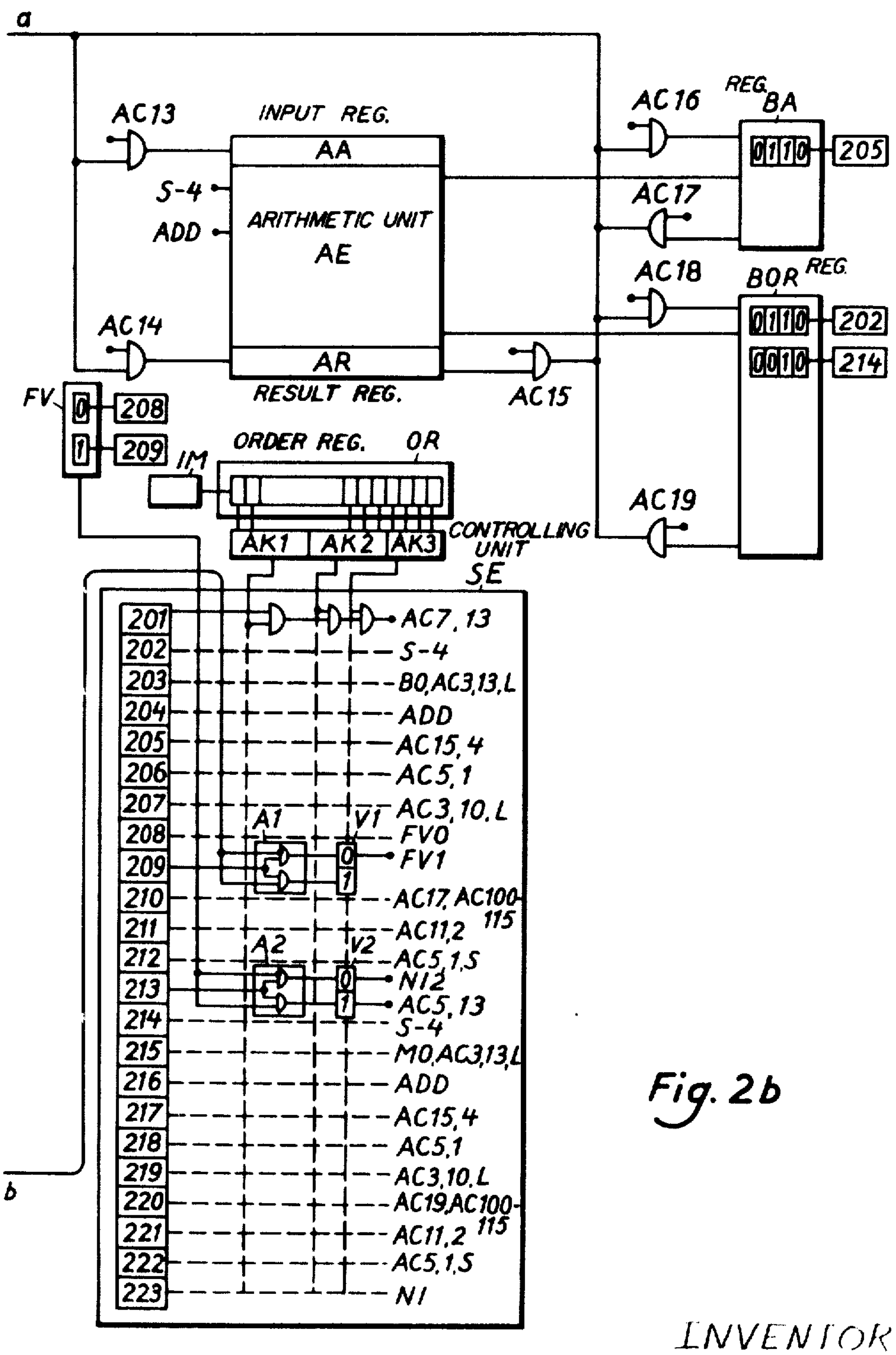

FIG. 2*a* and 2*b* shows how a binary 1 is written in a position in the primary and the secondary storage area, respectively, according to the invention.

Figure 3A:
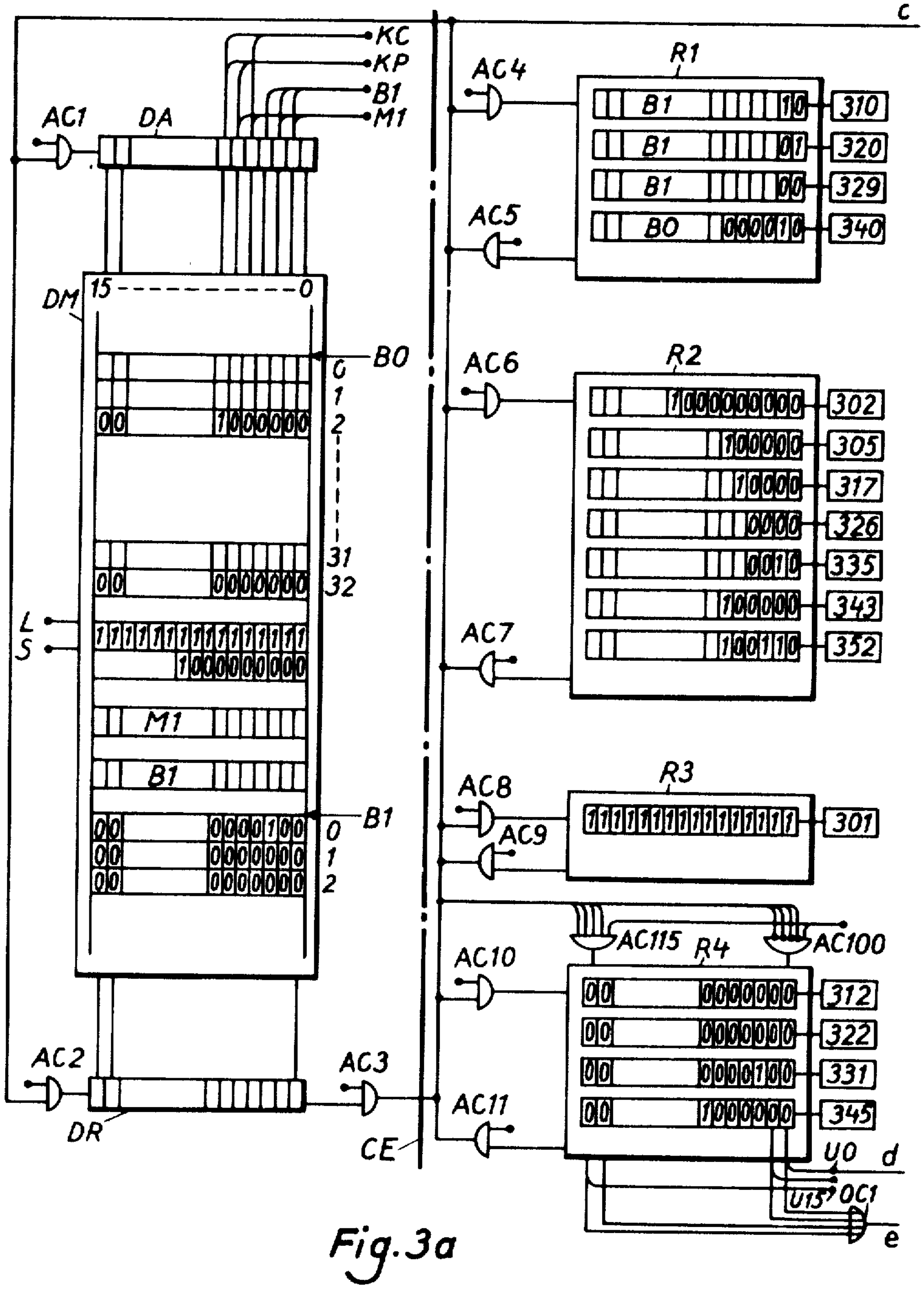
Figure 3B:
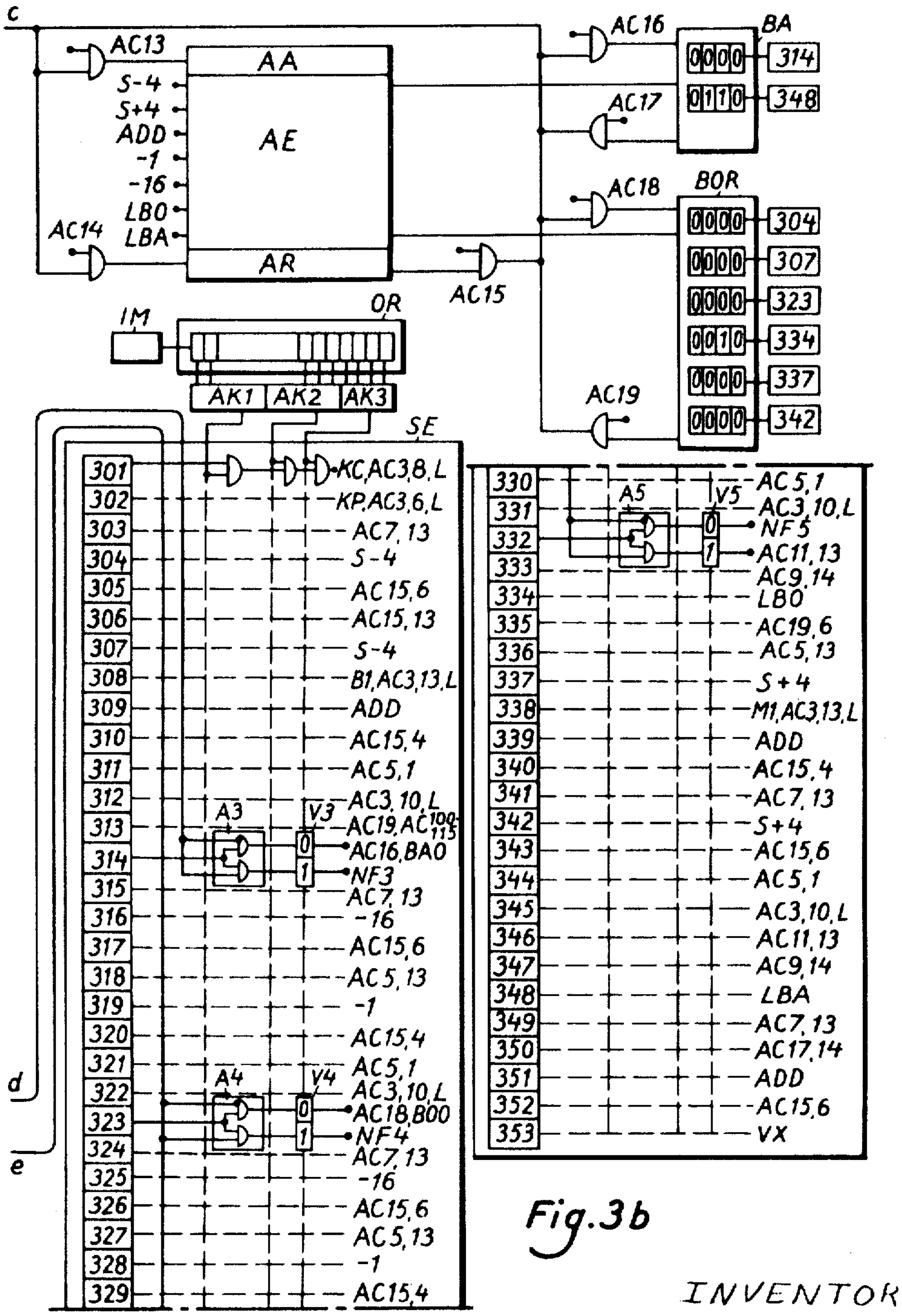

FIG. 3*a* and 3*b* shows the scanning of the storage areas and how it is determined where a binary 1 is written.

Figure 4A:
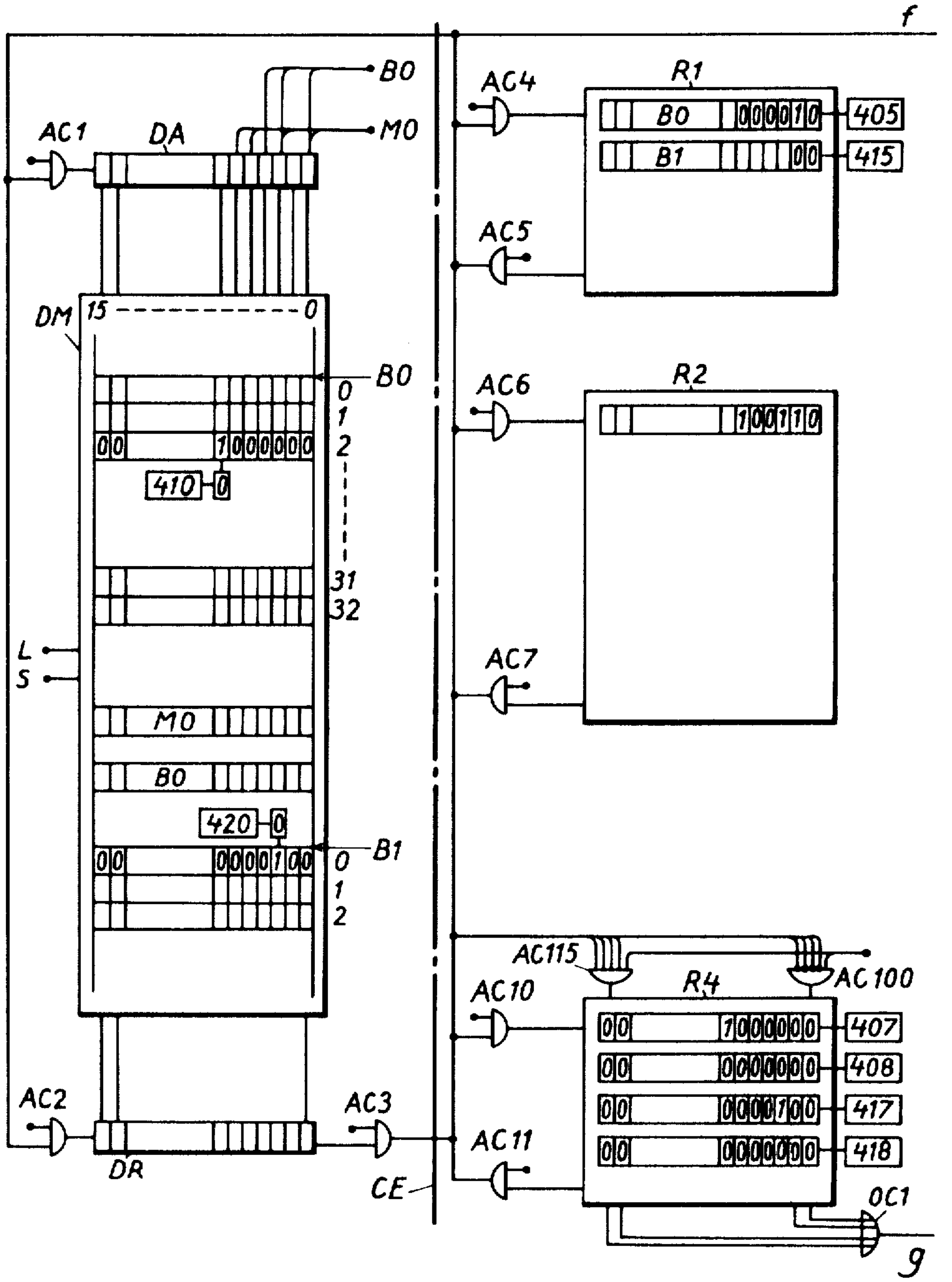
Figure 4B:
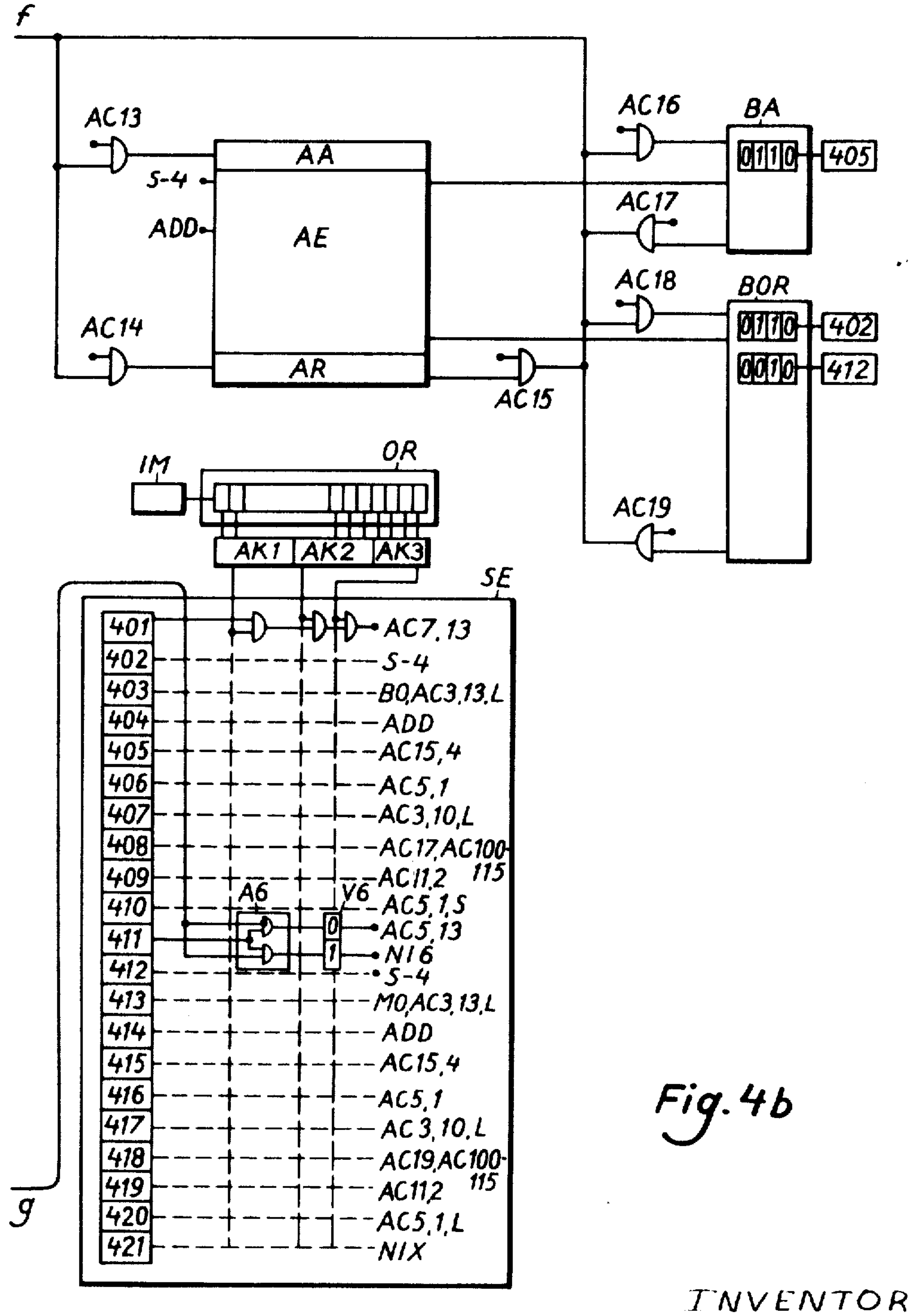

FIG. 4*a* and 4*b* shows how a binary 0 is written in the respective storage areas.

Figure 5A:
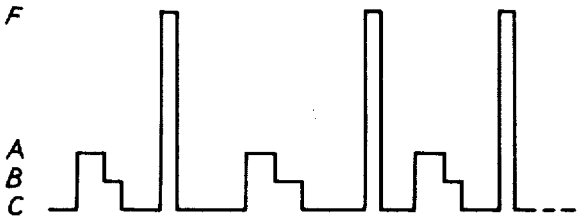
Figure 5B:
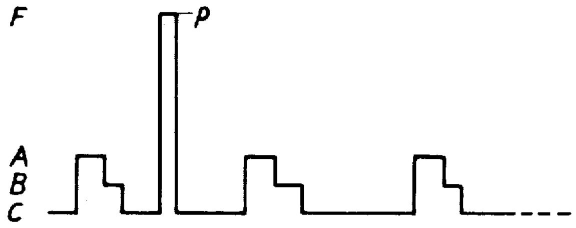
Figure 6:
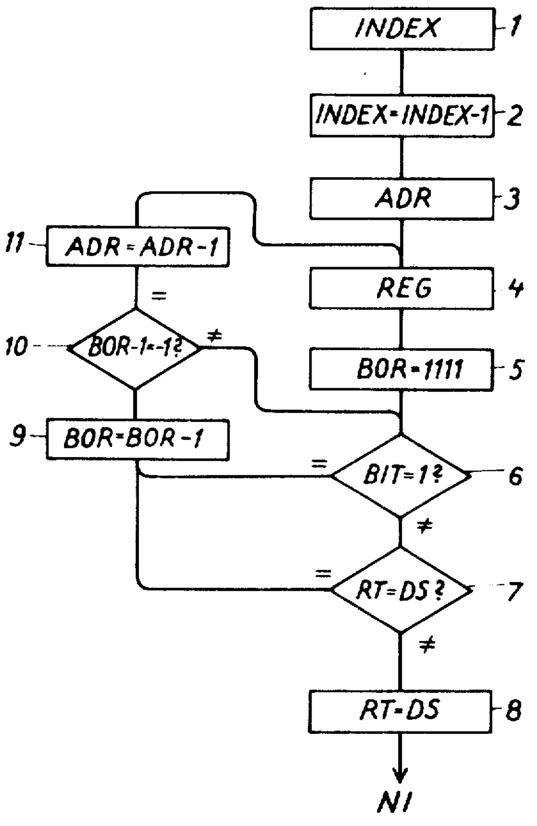

FIG. 5*a* and 5*b* show the time requirement for a fault-locating operation according to conventional methods and to the method of the invention respectively for repeated scanning of means, when a means in a group of means is faulty, and FIG. 6 shows a flow of a scanning program using the principles of the invention.

FIG. 1 shows the work B as a function of the traffic intensity T in a computer carrying out scanning and controlling functions concerning connecting means in a telecommunication system. Assume that a position in a storage area in the data store in a computer indicates the binary condition of a connecting means in the telecommunication system and that for example 16 positions, corresponding to 16 means, and grouped in a binary word in a storage area in the computer. Then a scanning of said means can take place by scanning the corresponding word, position after position. With such a scanning process, a diagram according to diagram I in FIG. 1 will be obtained. When there is no traffic, that is $T=0$, the traffic independent scanning time for a position is according to the example 15 microseconds and for a word 240 microseconds as is obtained on the vertical axis in FIG. 1. At $T=1$, i.e. when only one of the means has a change of state, a traffic dependent work is performed because the change has for example, be registered in a position in the data store or it must be determined which of the connecting means has changed state. Each of these processes requires for example 45 microseconds. Thus a total time equal to 285 microseconds is obtained. When two changes of state ($T=2$) have taken place, a traffic dependent work of 90 microseconds will be obtained as indicated in the diagram.

A method for decreasing the traffic independent part of the work is to use a secondary storage area in the data store and let each of the binary positions thereof represent, for example, one of the 16-bit words mentioned above. The positions of said secondary area can also be combined into 16-bit secondary words, so that a word in the secondary area corresponds to a primary storage area of $16 \cdot 16 = 256$ means. The scanning time for a word in the primary area will correspond at $T=0$ to the scanning time of a position in the secondary area, i.e. will take 15 microseconds as indicated in diagram II in FIG. 1 compared to 240 microseconds according to diagram I. At $T=1$, that is if only one change is to be handled, this must first be done in the primary area, which requires 45 microseconds according to what has been said above. Then, however, an address calculation from the primary area to the secondary area must be done in order to carry out the change in the corresponding position in this area also. This address calculation is also assumed to take 45 microseconds. Then to carry out the change itself in a position in the secondary storage area, requires exactly the same time, i.e. another 45 microseconds. Thus according to the example the total traffic-dependent work will take 135 microseconds at $T=0$. An analogous case arises if on the other hand it is a question of scanning the secondary storage area in order to define means in the primary area. In this case in a similar way 135 microseconds is needed to determine first a position in the secondary area, then to carry out the address calculation and then to determine the position in the primary area. Thus a total time of 150 microseconds is needed as shown in diagram II. From the diagram it appears that already for $T=3$ this method is more disadvantageous than the first despite the fact that the traffic independent part of the total work is considerably smaller.

Diagram III shows the work of a computer in which scanning and registration of changes are executed according to the invention, making the traffic independent work in the computer low while at the same time keeping the traffic dependent work within reasonable limits as will be described below.

FIGS. 2*a* and 2*b* show a process for registrating a change in the primary and the secondary storage area, respectively, in a computer. The computer comprises a data store DM and a central A0CE. The central unit B0+includes a number of registers R1, R2 and R4, arithmetic unit AE with registers BA and BOR, and a controlling unit SE connected to an order register OR. The transfer of data between the data store DM and the central unit CE and within the central unit respectively is carried out by means of a number of gates AC1–AC19 controlled by the controlling unit SE in accordance with an instruction fed to the order register OR in the known manner.

In the data store DM two storage areas are indicated, a primary storage area in which the nonactivated condition of each of a number of devices, for example connecting devices in a telecommunication system is represented by a binary "O" and the activated condition is represented by a binary "1", and also a secondary storage area in which by means of a binary "O" or "1" it is indicated that in a predetermined group of means in the primary area all means are in the nonactivated condition or at least one is activated. The primary area has according to the example the base address BO and comprises 32 16-bit binary words, numbered from 0 to 31, and a starting word with word index 32. The secondary area has according to the example a base address B1 and comprises two 16-bit binary words with index 0 and 1 respectively. Each of the positions in a word in the secondary area corresponds to one of the words in said primary area. Furthermore there is also a starting word in the secondary area with word index 2. Between the primary and the secondary storage area a predetermined fixed address relationship is arranged which is utilized according to the invention and which can be calculated in the following way. For an index X, i.e. the serial number for a position in the primary area, the complete address for each position in the primary and the secondary area respectively can be obtained according to the following:

$$A0=B0+X\cdot 2^{116\,4} \qquad (1)$$

$$A1=B1+X\cdot 2^{116\,8} \qquad (2)$$

$A0$ being a complete word and position address in the primary area for a position with index $X$ in the primary area,
$A1$ being a complete word and position address in the secondary area for a position with index $X$in the primary area,
$B0$ is the base address of the primary area, $B1$ is the base address of the secondary area, $X\cdot 2^{1}4$ indicates shifting of the index $X$ four binary positions to the right and $X\cdot 2^{18}$ indicates shifting of the index X eight binary positions to the right.
From equation (1)
$X=A0\cdot 2^{4}-BO\cdot 2^{4}$ is obtained
and from equation (2) $X=A1\cdot 2^{8}-B1\cdot 2^{8}$ is obtained
By insertion in the equation (1) $A0=B0-B1\cdot 2^{4}+A1\cdot 2^{4}$ is obtained. By insertion in the equation (2) $A1=B1-B0\cdot 2^{14}+A0\cdot 2^{14}$ is obtained
which may be written $A0=M1+A1\cdot 2^{4}$ and $A1=M0+A0\cdot 2^{14}$ respectively,
$M1=B0-B1\cdot 2^{4}$ and $M0=B1-B0\cdot 2^{14}$ being constants, allowing a direct conversion between an address in the primary storage area and an address in the secondary storage area and vice versa.

The constants $B0$and $M0$are registered in the data store DM according to FIG. 2*a* and can be addressed directly from the controlling unit SE by activating the inputs $B0$and $M0$respectively of an address register DA as indicated in FIG. 2*a*.

Into the address register DA is written the address of a word in the data store DM that is to be read out or written into the data store and said word is obtained or written respectively in a result register DR. Upon reading from the data store, a wire L is activated and upon writing into the data store, a wire S is activated from the controlling unit SE in a known manner.

The register R1 is intended for storing addresses of words both in the primary and the secondary storage area and the register R4 is intended for storing words read from the data store. The purpose of the register R2 will be explained below. Each of the successive conditions of the registers is indicated by a row, within the respective register frame.

The register R1 is a 16-bit register in which word addresses comprising both a base address and a word index are registered. The bit address register BA and the bit operation register BOR operate with the word address register R1 so that the contents of register BA combined with the contents of register R1 form an address to a position in the primary area when the address to a word in the primary area is registered in register R1, while the contents of register BOR combined with the contents of register R1 form an address to a position in the secondary storage area when the address to a word in the secondary area is registered in register R1.

The words read from the data store DM are registered in the 16-bit register R4. It is possible to change the condition of the positions of the register R4 one at a time by means of 16 AND-gates AC100-AC115 addressable from registers BA and BOR To be able to scan the contents of the different positions of register R4, the register is provided with an OR-gate OC1 having 16 inputs, each corresponding to one of the 16 positions of the register as indicated in FIG. 2*a*.

The arithmetic unit AE is provided with an input register AA and a result register AR for writing either of two operands, the result after an adding or subtracting operation being obtained in the result register AR by changing the operand written into said register to the result of the operation. For other operations, for example right- or left-hand shifts, the word to be shifted is written into the input register AA, after which the desired operation takes place under control of an order from the controlling unit SE and the result of the operation is obtained in the result register AR. The following operations in the arithmetic unit AE can be controlled from the controlling unit SE in the example according to FIG. 2*a* and 2*b*:

1. To shift the contents of register AA four positions to the right, (the four least significant positions are shifted to the register BOR and the other positions are shifted into the result register AR), the input S-4 is activated.

2. To add the contents of registers AA and AR, the input ADD is activated.

A flag FV is arranged to indicate whether or not a change in a position in a word in the primary storage area is to cause a corresponding change in the position in the secondary area belonging to said word in the primary area. It is possible that the change is not the first one in a certain word in the primary storage area and in that case the position in the secondary area belonging to the word in the primary area has been changed already.

The operation of the computer is prescribed by a number of instructions in an instruction memory IM indicated in FIG. 2*b*. The instructions are transferred to an order register OR where they are decoded by a number of decoders AK1-3, indicated in FIG. 2*b*. In the controlling unit SE there is a number of microprograms, selected in accordance with signals obtained from said decoders. A clock pulse generator, not shown, then steps the selected microprogram and in each step of the microprogram a number of operations are carried out as will be described hereinafter.

As mentioned, each connecting means or device in a computer controlled telecommunication system, for example, each line relay has an individual position in a storage area within the data store where the actual condition of the respective means is registered. The condition of the connecting means or device is scanned periodically and compared with the registered condition in the positions in said storage area. If a change in a means is encountered upon scanning, the corresponding position in the storage area is to be updated. This may be done by writing for example a binary "1" in the corresponding position in the storage area upon encountering a busy condition. The changes encountered must also be registered in the primary storage area in order to make it possible for the computer to deal with the respective means having caused the change. Between said storage area and said primary area there is a fixed relationship in such a way that index of a position in the storage area is identical with index of the corresponding position in the primary storage area. Index of an encountered change is registered in the register R2 so as to make it possible for the computer to set the corresponding position of the primary storage area to its 1-condition. According to the invention the position in the secondary storage area corresponding to a group of positions in the primary area is simultaneously set to its 1-condition as will be described with the help of FIGS. 2*a* and 2*b*.

It is assumed that upon scanning, for example the line relays, a change in relation to the conditions earlier registered in said storage area has been found concerning the relay having index 38. This index is as said above registered in the register R2 in binary form, i.e. 100110, as indicated in FIG. 2*a*. Upon encountering a change, it is necessary to carry out an instruction which, according to the invention, writes a binary "1" in the position in the primary area having the index registered in register R2, as well as writes a binary "1" in the position in the secondary storage area, corresponding to the respective word in the primary area. This instruction is transferred to the order register OR, after which the controlling unit starts the microprogram indicated by the stages 201–223 in FIG. 2*b*.

By means of the microprogram, starting with the registered index 38, the address to the corresponding position in the primary area is calculated according to the equation (1). This is done by adding to the base address *B*0, the index registered in the register R2, shifted 4 binary positions to the right. The process starts by transferring, in the first step 201 of the microprogram, the contents of register R2 to register AA in the arithmetic unit AE via the gates AC7 and AC13. In the next step 202 the input S-4 of the arithmetic unit is activated and the contents in register AA are shifted four positions to the right. The four least significant positions in register AA are shifted to the bit operation register BOR as indicated by 202. The base address *B*0 is stored in the data store DM and can be addressed directly from the controlling unit SE. *B*0 is transferred in step 203 to the register AA by a simultaneous activation of the input *B*0 in register DA, of the gates AC3 and AC13 and of the input L in the data store, Then the input ADD will be activated in the arithmetic unit and as a consequence, the base address *B*0 is added to the contents of register AR The result of the addition is obtained in register AR and transferred in step 205 to the register R1 via gates AC15 and AC4. In register R1, *B*0 plus binary 000010 is obtained as indicated in step 205 in register R1. The contents of the bit operation register BOR are transfered to the bit address register BA in connection with the writing of an address to a word in the primary area in register R1. This is indicated by step 205 in register BA. The contents of register R1 indicate the address to the word in the primary area having index 2, and the contents of register BA read binary 0110, i.e. the address of a position having index 6. Consequently be means of registers R1 and BA the 38th position in the primary storage area is selected, i.e. starting with the index mentioned above the address to the 38 position in the primary area has been calculated.

The word selected by the contents of register R1 is read from the data store and transferred to the register R4. This is done by the microprogram in the steps 206 and 207. The address in register R1 is transferred via the gates AC5 and AC1 to the address register DA of the data store (step 206). Then the contents in the data store at said address are read to the register R4 via the gates AC3 and AC10 being opened at the same time as the wire L of the data store is activated. The flag FV is set to its 0-position in step 208. In step 209, the contents of the register R4 are sensed by means of the OR-gate OC1. The output signal from gate OC1 is supplied to a logic circuit A1 having two outputs, the activation of one of these outputs, i.e. when there is no position set to 1 in register R4, brings the flip-flop V1 to its 0-condition, and the activation of the other output, i.e. when there is at least one position set to 1 in register R4, brings the flip-flop V1 to its 1-condition. In step 209 the logic circuit A1 is activated and in consequence of the fact that it receives no signal from the gate OC1, it brings the flip-flop V1 to its 0-condition, resulting in the fact that the flag FV is set to its 1-position. This is indicated by FV1 at the O-output of the flip-flop V1.

If one or more of the positions in the register R4 are in their 1-condition at the beginning of the process described, the flip-flop V1 would be set to its 1-condition and consequently the flag FV would not have been set to its 1-position. This would have indicated that the position of the secondary area, corresponding to the word at present in register R4, had been set to its 1-condition earlier and for this reason another 1-setting is not required.

The position in register R4, selected by the contents of the bit address register BA is set to 1 in step 210 by a controlling pulse supplied via the gates AC100–115. Said pulse, however, can activate only the gates whose input condition corresponds to the position defined by the contents of register BA. This 1-setting is indicated in register R4 in step 210. The contents of register R4 are then transferred back to the data store. The gates AC11 and AC2 are opened in step 211 and the gates AC5 and AC1 are opened in step 212 simultaneously with a writing order from the controlling unit SE activating input S in the date store. Thus after executing step 212 the first part of the process is finished, i.e. a 1 has been written into the 38th position of the primary storage area, as indicated by 212 in the data store.

To carry out a corresponding 1-setting in the secondary storage area, a new address calculation has to take place. First, however, the condition of the flag FV is scanned in step 213. Depending on the fact that all positions in register R4 were set to their 0-condition in step 209, the flag was set to its 1-position in this step. The output signal from the flag FV is supplied to a logic circuit A2 having two outputs, the activation of one of these brings a flip-flop V2 to its and the activation of the other output brings the flip-flop to its 1-condition. In stage 213 the logic circuit A2 is activated and in dependence on the fact that the flag FV is in its 1-position or in its 0-position the flip-flip V2 mentioned above is brought to its 1-position or to its 0-position respectively. In this case the flip-flop V2 will be set to its 1-position and the address calculation is started by the contents of register R1 being transferred to the register AA in the arithmetic unit AE via gates AC5 and AC13.

If on the other hand the flag FV were in its 0-condition this would imply that a 1-setting has already taken place in the secondary area due to the fact that at least another position in the corresponding word in the primary storage area would be in its 1-condition, so that no further 1-setting in the corresponding position in the secondary area is necessary. In that case a new instruction would be supplied to the order register OR and a completely new process is started. This is indicated by NI2 on the O-output of the flip-flop V2.

In the step 214 the contents of register AA are shifted four positions to the right by activating the input S-4 in the arithmetic unit AE. The four least significant positions are shifted to the register BOR, the contents of which will consequently be binary 0010. This is indicated by 214. The contents of the result register AR after the shifting are *B*0. $2^{116\ 4}$ plus a number of zeros. Then the constant *M*0 from the data store is read to register AA. This occurs in step 215 by direct-addressing of the constant *M*0. The gates AC3 and AC13 will then be opened and a new reading order activating input L in the data store is obtained. In register AA the constant *M*0, i.e. B1-B0.2 $^{1}$4 is registered. Adding the contents of registers AA and AR is done by activating the input ADD of the arithmetic unit in step 216. The result of the addition will be *B*1 plus a number of zeros, indicating the address of the word with index 0 in the secondary area. Said result is transferred in step 217 to the register R1 which consequently, together with register BOR, selects the position having index 2 in the word having index 0 in the secondary storage area. The next process will be to set the selected position in the secondary area to its 1-condition. This is done in the same manner as described in connection with the 1-setting in the primary area. The selected word is read to register R4 in the steps 218 and 219. The 1-setting of the selected position takes place in step 220 in the same way as described above, but with the difference that the position in question is addressed from register BOR. Then the word will be written into the data store again in steps 221 and 222. The microprogram indicated in FIG. 2*b* has now been completed and the next instruction is transferred to the order register OR from the instruction store IM in step 223. This is indicated by NI.

By means of FIGS. 2*a* and 2*b* a method for carrying out a 1-setting in the primary as well as in the secondary storage area has been described, starting with an index of a position in a storage area. A scanning process will now be described in connection with FIGS. 3*a* and 3*b* in order to determine the index of a position set to its 1-condition, by starting periodically from a starting index. The result of the scanning process is obtained as index to the position set to 1 in connection with the 1-setting described above.

FIGS. 3a and 3b show the data store DM and the central unit CE of a computer in the same way as FIGS. 2*a* and 2*b*. The base address *B*1 of the secondary storage area is stored in the data store and can be addressed directly from the controlling unit SE by activating the input *B*1 of address register DA as indicated in FIG. 3*a*. The constant M1 can be addressed by activating the input M1 in register DA. Furthermore there are two other constants stored in the data store. One of said constants selects the starting index for scanning the primary storage area and is equal, according to the embodiment, to binary 1000000000, i.e. the 512th position. The other constant is a comparison word composed of 161-set positions. The constants are indicated in the data store DM and can be addressed by activating the inputs KP and KC, respectively, in register DA. Their function will appear in connection with the description of the scanning process. Registers R1 and R4 are used for storing word addresses and words, respectively, in the same way as in the preceding embodiment. The contents of a certain, fixed position of register R4 can be sensed. This is indicated by a number of outputs UO–U15, each corresponding to a position in register R4. The purpose of register R2 will appear from the description and the comparison word mentioned above is stored in a register R3 during the scanning process. Besides the earlier mentioned operations S-4 and ADD, the following operations can be carried out in the arithmetic unit AE.

3. To shift the contents in register AA four positions to the left, activate input S+4. (The four least significant positions are obtained from register BOR and the result is obtained in register AR).

4. To subtract 1 from the contents of register AA, activate input −1.

5. To subtract 16 from the contents of register AA, activate input −16.

6. To compare the contents of register AA and AR and put index to the most significant position conformity in the register BOR, activate input LBO.

7. To compare the contents of register AA and AR and put index to the most significant position conformity in the register BA, activate input LBA.

In order to determine the index of positions set to 1 in the primary area, the microprogram indicated in the controlling unit SE, in FIG. 3*b*, will be connected periodically. It is assumed that the means whose change of condition was registered in the preceding example, is to be identified, e.g. for a connecting process. The starting index for the scanning process is as mentioned 512, i.e. the 0-th position of the starting word (register 32) in the primary storage area. This starting word is composed of 16 positions in their 0-condition as indicated in FIG. 3*a*. The comparison word with its 16 1-set positions is transferred to the register R3 in the first step 301 of the microprogram, by activating the input KC of the address register DA, the gates AC3 and AC8 and of the reading input L. In the next step 302 the starting index is transferred from the address KP in the data store to the register R2. This starting index thus selects the starting position for a scanning of the primary store area, said starting position being according to the example the 0-th position of the word with index 32. However, according to the invention, the secondary storage area is scanned and upon encountering a position set to its 1-condition in the secondary area, the address to the corresponding word in the primary area, containing the position which is set to 1 is calculated. By means of the starting index, the starting position for a scanning of the secondary area can be calculated according to equation (2), $A1 = B1+X.2^{18}$. To the base address B1 is added the starting index shifted 8 positions to the right. This is done in steps 303–310. The starting index is transferred to the register AA in the arithmetic unit AE. The input S–4 is then activated and the contents of AA are shifted four positions to the right. The four least significant positions are shifted to the register BOR, indicated by 304 in BOR. The other positions are transferred in step 305 from register AR to the register R2 (305). In step 306 the contents of AR are supplied to the register AA via gates AC15 and AC13. The input S-4 is then activated again. After this operation the original starting index has been shifted 8 positions to the right. The base address *B*1 is then read from the data store to the register AA and is added to the shifted starting index. The result of the addition is transferred in step 310 to the register R1. The contents in register R1, i.e. *B*1 plus binary 10, select the starting word in the secondary storage area and the contents in BOR, i.e. 0000, select the position with index 0 in the starting word. The starting word in the secondary storage area is according to the example composed of 16 positions set to 0. The starting word which is selected by the contents of register R1 is read to register R4 in step 312. The contents of the position selected by register BOR are sensed upon the opening of gate AC19 which activates the gate among the gates AC100–115 having an input condition corresponding to the binary information registered in register BOR. On the corresponding output in register R4, i.e. the output UO according to the example, it will be decided in step 314 whether the position is in its 1-condition or in its 0-condition. A zero will appear on the output UO, all positions being in their 1-condition in the starting word. The signal from the output UO is supplied to a logic circuit A3 having two outputs, the activation of one of the outputs, i.e. when no signal is obtained from the output UO, brings a flip-flop V3 to its 0-condition and the activation of the other output, i.e. when a signal is obtained from the output UO, brings the flip-flop V3 to its 1-condition. In step 314 the logic circuit A3 is activated and depending on the fact that no signal is obtained from the output UO, the flip-flop V3 this brought to its 0-condition. From the O-output of the flip-flop V3 the gate AC16 is activated and the register BA is set to 0. This is indicated by 314 in register BA.

Of course it is not always necessary to start a scanning process from the starting index of the primary storage area, but an optional lower index may be transferred to the register R2, from for example a storage area in the data store. In that case it may happen that the 1-output of the flip-flop V3 is activated in step 314. As a result the microprogram will automatically start a new process, essentially the same as the process to be described in connection with the step 332–353. This new process is indicated by NF3 on the 1-output of the flip-flop V3.

In the microprogram there now follow an address calculation to the word having index 1 in the secondary storage area, after which said word is read from the data store. In step 315 the contents of register R2 will be transferred to the register AA in the arithmetic unit AE after which the input −16 in the arithmetic unit AE is activated in step 316, causing subtraction of sixteen, i.e. binary 10000, from the binary number 100000. The result of the subtraction, i.e. binary 10000, is then transferred to the register R2, indicated by step 317 in register R2. The purpose of the subtraction is to determine whether the scanning process is finished or not, as will be further described in connection with step 332. The contents of register R1, i.e. *B*1 plus binary 10, are transferred to register AA in step 318. The input −1 is activated in step 319, and one is subtracted from the contents of register AA. The result of the subtraction will be *B*1 plus binary 01, i.e. the address to the word having index 1 in the secondary storage area, and this result is transferred to the register R1 in step 320. The word having index 1 in the secondary storage area is transferred in steps 321–322 to the register R4, indicated by step 322 in register R4. In order to find out if the word in register R4 has a position set to 1, this register will be sensed in step 323 by means of the OR-circuit OC1 having 16 inputs, each corresponding to a position in register R4. The output signal from the OR-circuit OC1 is fed to a logic circuit A4 having two outputs, the activation of one of these outputs, i.e. when there is no 1-set position, brings a flip-flop V4 to its 0-condition and the activation of the other output. i.e. when there is at least one 1-set position, brings the flip-flop V4 to its 1-condition. In step 323 the logic circuit A4 is activated and due to the fact that it obtains no signal from the OR-circuit OC1, it brings the flip-flop V4 to its 0-condition. From the O-output of the flip-flop V4, the gate AC18 is activated and the register BOR is set to 0 as indicated in step 323 in register BOR. If on the other hand the 1-output of the flip-flop V4 was activated, it would mean that the word in the register R4 contains at least one 1 and the following process of the microprogram would be identical with the process to be described in connection with the steps 332–353. This is indicated by NF4 at the 1-output of the flip-flop V4. In the steps 324–331 an address calculation to the word in the secondary storage area, having index 0, is to take place and also the reading of said word. First in step 324, the contents of register R2 are transferred to the register AA and in step 325, 16, i.e. binary 10000, is subtracted from the contents in register AA by activating the input −16 in the arithmetic unit AE. The result of the subtraction, i.e. 0000, is transferred to the register R2 in step 326. In the steps 327–329, 1 is subtracted from the contents in register R1, causing the word having index 0 in the secondary storage area to be selected by the address in register R1 as indicated by 329. In the steps 330–331, the word having index 0 in the secondary storage area, is read from the data store to the register R4. This is indicated by 331 in register R4. As in step 323 the contents in the register R4 are sensed by means of the OR-circuit OC1 in step 332. The output signal from the OR-circuit OC1 is supplied to a logic circuit A5, bringing a flip-flop V5 to its 1- or 0- condition in dependence on whether the word in register R4 contains a 1 or not. In step 332 this logic circuit is activated and due to the fact that a position is set to 1 in register R4, the logic circuit A5 will obtain a signal from the OR-circuit OC1, bringing flip-flop V5 to its 1-condition. As a result the gates AC11 and AC13 will be activated and the contents of register R4 transferred to register AA.

If on the other hand the O-output of the flip-flop v5 was activated in step 332 due to the fact that no 1-set position existed in register R4 the following process of the microprogram would be identical with the process described in the steps 323–325. However upon subtraction of binary 10000 from the contents in register R2, in step 325 equal to 0000, a carry would appear, implying that the scanning of the secondary storage area is finished. This process is indicated by NF5 at the O-output of the flip-flop V5.

In step 333 the comparison word, comprising 16 1-set positions is transferred to the register AR from the register R3. In step 334 the input LBO of the arithmetic unit AE is activated and index to the most significant 1-set position in register AA is obtained in register BOR. In the register BOR, binary 0010 will be obtained as indicated. This means that the position having index 2 in the 0-th word in the secondary storage area is in 1-condition. In step 335 said index is transferred to the register R2 as indicated. Now it remains to identify the position in the primary storage area having caused the 1-setting of the position in the secondary store area. First the address of the corresponding word in the primary storage area is calculated in steps 336–339. The contents of the register R1 are transferred to the register AA in the arithmetic unit AE in step 336. Then the input S + 4 of the arithmetic unit is activated in step 337 and as a result the contents of register AA are shifted four positions to the left. In the result register AR, $B1\cdot2^4$ plus binary 0010 is obtained, the four least significant positions being obtained from the register BOR. In step 338 the constant MO, i.e. $B0-B1\cdot2^4$ is transferred to the register AA and in step 339 the contents of register AA and AR are added by activating the input ADD of the arithmetic unit AE. The result of the addition, i.e. BO plus binary 0010 is transferred to the register R1 in step 340 as indicated. The address in register R1 now selects the word in the primary storage area, having index 2. In step 341 the contents of register R2 are transmitted to register AA and in step 342, the input S+4 is activated, the four least significant positions being obtained from the register BOR. The result of the shifting is transferred to register R2 in step 343 and the contents of said register will be binary 100000 as indicated. The word, selected by the contents of register R1, is read to the register R4 in steps 344–345 by activating the gates AC5 and AC1, the gates AC3 and AC10 and the input L in the data memory respectively. To be able to determine the index of the position set to 1 in register R4, the contents of register R4 are supplied in step 346 to the register AA in the arithmetic unit AE. In step 347 the comparison word comprising 16 1-set positions is transferred to the register AR, after which the input LBA of the arithmetic unit AE is activated in step 348. Upon activating said input the index of the most significant position set to 1 in register AA will be registered in the register BA. The contents of register BA, i.e. binary 0110 indicates that the sixth position of the word of the primary storage area, having the address *B*plus 0000 is obtained and in the register nor binary plus binary 0010 according to the contents of the register R1 is set to the 1-condition. In step 349 the contents of the register R2 are supplied to the register AA and in step 350 the contents of register BA are transferred to the register AR. Then the input ADD of the arithmetic unit AE is activated in step 351 and the result of the addition is transferred to the register R2 in step 352. Thus in the register R2 the index binary 100110, i.e. 38, is registered for the position set to 1 in the primary storage area. This is indicated by 352 in the register R2. Due to the fact that index of a position in the primary storage area is identical with index of the corresponding position in said other storage area, a means in the telecommunication system will be identified by means of the index in register R2. After having identified a means in the manner described, an executing program will for example start to control said means. This is indicated by VX in step 353.

In connection with FIGS. 4*a* and 4*b*, showing the same computer as FIGS. 2*a* and 2*b*, a method of 0-setting a position set to 1 in the primary and the secondary storage areas will be described. Said 0-setting can be effected for example after that an executing program has dealt with the means in question. After finishing the executing program, a zero setting instruction is transferred from the instruction memory IM to the order register OR and the decoders AK1–AK3 activate the microprogram indicated in the controlling unit SE. The position to be set to 0 is the one (38) set to 1 in the process described in connection with the FIGS. 2*a* and 2*b*. Index of the position to be set to 0 is registered in the register R2 as indicated in FIG. 4*a*. Starting from this index the 0-setting is executed in the steps 401–420. First the address of the corresponding position storage area is calculated in steps 401–405, identical with the steps 201–205, described in connection with FIGS. 2*a* and 2*b*. The address of the word in the primary area, containing the position set to 1 is obtained in the register R1, and index, within said word, is obtained in the register BA as indicated by 405. The word having the address corresponding to the contents of register R1, is read to the register R4 in steps 406–407. The position set to 1 in said word is set to 0 in step 408 by letting the contents of register BA activate that one of the gates AC100–AC115, having an input condition corresponding to the contents of register BA. In this case the position having index 6, binary 0110, is set to 0 as indicated by 408 in the register R4. The word is then rewritten into the data store DM in the steps 409–410 as indicated by 410 in the data store DM. In step 411 the contents of the register R4 are sensed by the OR-circuit OC1 in order to find out whether there is another 1-set position in the word at present in register R4. If so, no 0-setting of the corresponding position in the secondary storage area is to take place. The output signal from the OR-circuit OC1 is supplied to a logic circuit A6 having two outputs, the activation of one of the outputs, i.e. when there is no further 1-set position, brings a flip-flop V6 to its 0-condition and the activation of the other output, i.e. when there is at least another position set to 1, brings the flip-flop to its 1-condition. In step 411 the logic circuit A6 is activated and due to the fact that no signal is obtained from OR-circuit OC1 the flip-flop V6 is brought to its 0-condition causing the address to the corresponding position in the secondary storage area to be calculated. This is done by transferring the contents of register R1 to the register AA upon activating the O-output of flip-flop V6.

If on the other hand the 1-output of the flip-flop V6 was activated, it would mean that the word in register R4 still contains at least one 1-set position and for that reason the position in the secondary storage area belonging to the word should not be set to 0. As a consequence, a new instruction would be initiated from the 1-output of the flip-flop V6 as indicated by NI6.

The address calculation continues in step 412 when the inputS–4 of the arithmetic unit AE is activated. In the result register AR, $B0{\cdot}2^{14}$ plus 0000 is obtained and in the register BOR binar 0010 is obtained, as indicated. The constant MO, i.e. $B1-B0{\cdot}2^{14}$, is read to the register AA in step 413 and after that the input ADD of the arithmetic unit AE is activated in step 414. In the result register, *B*1 plus 00 is obtained. This result is transferred to the register R1 in the step 415 as indicated. The word in the secondary storage area whose address is registered in register R1, is read in the steps 416–417 to the register R4. In the step 418 the position in register R4, having the index registered in the register BOR, is set to 0 upon activating the gate among the gates AC100–AC115 having an input condition corresponding to the contents of register BOR. In the steps 419–420 the contents in register R4 are transferred to the data store, as indicated by 420 in the data store.

Then the computer commences the following program, for example continues to scan the storage area as described in connection with FIGS. 3*a* and 3*b*. This is indicated by NIX in step 421.

The saving of time in comparison with conventional methods explained in connection with FIG. 1 is valid for each of the embodiments described. If a fault is encountered during a scanning process in a group of means, i.e. in a group of positions in a storage area indicating the condition of the respective means, a fault-analyzing operation will be carried out, said operation including among other functions a comparison with registered addresses to faults already detected, to find out if the fault just encountered is a new one.

This means that for the same fault in a group of means, a fault-analyzing operation will be executed every time said group is scanned, until the fault is repaired.

In order to avoid this repeated fault-analyzing process for the same fault, a secondary storage area may be used as will be described. Each position in said secondary storage area indicates in this case if a corresponding group of means to be scanned contains a faulty means. The secondary storage area is in this case scanned position after position and in case there is no indication in a position, indicating a fault in the corresponding group of means, said corresponding group of means will be scanned. If, however an indication is encountered, indicating that the corresponding group of means contains at least one faulty means, said corresponding group of means will not be scanned but the scanning of the positions in said secondary storage area will be continued.

The computer is in this example supposed to process programs on different priority levels A, B or C according to FIGS. 5*a* and 5*b* depending on the degree of urgency of the respective program to be processed. The processing is periodically interrupted by a clock signal for recommencing the processing of the program on priority level A. When the processing on the A-level is finished, the computer commences the program on level B, which is completed before the processing on the lowest priority level C starts. The program on level C is then continued until the next clock interruption. If, however, a faulty means is encountered during the scanning the computer will immediately start processing on fault level F, with higher priority than the levels for normal work A, B and C. On level F a fault program is initated for analyzing where the fault is located, deciding whether the fault is new or not, starting an alarm signal if the fault is new and writing out a description of the fault.

Assuming that a fault is encountered during the scanning on the C-level of a number of means. As mentioned the computer ascends to the fault level F as soon as a fault is encountered, on which level said fault-analyzing program is processed. If the time necessary for carrying out the whole fault-analyzing operation amounts to approximately 200 microseconds, and a primary interval, i.e. the time between two successive clock interruptions is for example 10 milliseconds, 2 percent of the primary interval is needed for the fault-analyzing operation. Thus each time said means is scanned, 2 percent of the primary interval will be needed for analyzing the same fault, until the fault has been repaired. Such a process is indicated in FIG. 5*a*. The means are, according to the example, scanned in each primary interval. If further faults are encountered within the same primary interval, said fault-analyzing program will be processed for each fault, and the analyzing is carried out each time, the fault may be new or not. It is easy to understand that this causes a large amount of unnecessary processing in the computer.

By using a secondary storage area it can be achieved that a fault is analyzed only the first time it is encountered. Upon encountering for the first time a fault in a group of means, this will be indicated in the corresponding position in said secondary area by for example setting the position to 1 at the end of said fault-analyzing program (point P in FIG. 5*b*). The scanning program scans in this case first the positions in the secondary storage area in order to find out if a position, corresponding to a group of means is set to 1 or not, so that when a position set to 1 is encountered in the scanning process, the corresponding group will not be scanned as will be explained in connection with FIG. 6. As indicated in FIG. 5*b* the scanning continues in the following primary intervals without scanning the group corresponding to the 1-set position in the secondary storage area.

FIG. 6 shows a block diagram of a program for scanning means, i.e. positions representing the actual condition of the respective means. In this case a binary 1 is registered in the secondary storage area in a position corresponding to a group of means if a faulty means is detected in the group. If a position is set to 1, the corresponding group of means will not be scanned until the fault is repaired as will be explained.

In connection with FIGS. 2*a*–2*b* a process was described, in which an encountered change between the actual condition of a line relay and the condition of the corresponding position in a storage area was entered in both the primary and the secondary storage area. By means of FIG. 6 will be described how said change is selected and how it is possible to avoid that a fault in for example a line relay is analyzed in several successive primary intervals by utilizing a secondary storage area.

Step 1 ("INDEX") in FIG. 6 is identical with the step 302 in FIGS. 3*a*–3*b*, i.e. the starting index of a scanning process is transferred to a register. In order to avoid a word, used only as a starting word in the secondary storage area, 1 will be subtracted in step 2 ("$INDEX = INDEX - 1$") from said starting index. By means of the new index, the address of the corresponding word in the secondary storage area will then be calculated in step 3 ("ADR") in a way similar to steps 303–310 in FIG. 3a–3b. The word in the secondary storage area, selected by the calculated address, is read in step 4 ('-'REG") to a register, for example to the register R4 indicated in FIG. 3a. In the bit operation register BOR, binary 1111 is written in step 5 ("*BOR* = 1111") so that when scanning 16-bit secondary words the scanning is always started with the most significant binary position of the word by activation of the AND-circuit AC115 indicated in FIG. 3a. In step 6 ("*BIT* = 1??) the position selected by the bit operation register BOR is sensed, to find out if the position is set to 1 or 0, i.e. if at least one fault in the corresponding group of means is registered. Assume at first that the selected position is set to 0. This implies that the corresponding group of means is faultless and the scanning can take place. The scanning of the corresponding group of means is in this case executed in step 7 ("*RT*=*DS*?"), indicating that a control function is carried out concerning the identity between the condition in the group of means and the condition in the storage area in the data store. If there is a difference between said conditions, said storage area has to be updated immediately, in accordance with the condition in the respective group of means, by executing an updating program ("*RT*=*DS*" in step 8), for example the programs described in connection with FIGS. 2a–2b or FIGS. 4a–4ba. After that the next instruction is processed concerning for example a calculation for the means in which the difference just was found. This is indicated by NI. If, on the other hand, no difference is discovered in step 7, 1 will be subtracted from the contents of the bit operation register BOR i.e. the position next in significance in said register is selected (step 9, "*BOR*=*BOR*−1"). In the same way, the position next in significance in the register is selected, if the position selected in step 6 is set to 1, i.e. if at least one means in the corresponding group of means is faulty. Thus, a group of means containing a faulty means is not compared with the corresponding word in the storage area until the fault is mended. This implies that a considerable saving of scanning time is obtained. In step 10 ("*BOR*−1=−1?") it is sensed whether the subtraction in step 9 causes a carry or not, i.e. if all the positions in the word have been scanned. If no carry is obtained, step 6 is carried out again and the position selected by the new contents of register BOR is scanned. In the same way the scanning is continued until every position in the word in said register has been scanned. When the subtraction in stage 9 results in a carry, 1 will be subtracted from the address calculated in step 3, so that a new word in the secondary storage area is selected (step 11, "*ADR*=*ADR*−1"). The new word selected is in step 4 read to said register, after which the scanning of the positions of the new word is carried out. The process is to continue until all the positions in the secondary storage area have been scanned.

By utilizing a secondary storage area to indicate a fault in a group of means as described, it is possible to analyze a fault only the first time it is encountered. The 1-setting of a position in the secondary storage area must in this case not necessarily be done in connection with a fault-analyzing program but can be done so as to control selective scanning programs. Then it would be possible to momentarily scan certain means, for example line relays, with longer intervals in order to attain a momentary decrease in the work of the computer.

I claim:

1. In a computer which scans the states of a plurality of devices and controls the devices in accordance with their states the method of recording the state of a particular device comprising the steps of providing in the store of said computer a first storage area with a plurality of addressed positions wherein each position is assigned to a particular one of said devices, providing in the store of said computer a second storage area with a plurality of addressed registers each having a plurality of positions wherein each position of each register is assigned to a different group of said addressed positions of said first storage area, assigning the addresses of said addressed registers of said second storage area according to a fixed relation to the addressed positions of said first storage area, said relationship including a division by a multiple of the base of the number system of said computer indicating the address of the position in said first storage area associated with said particular device, recording a representation of the state of said particular device in the position in said first storage associated with said indicated address, right shifting said indicated address a number of digit positions associated with said multiple, adding a given constant to the shifted address to generate the address of a register in said second storage area, and recording a representation of the state of said particular device in a position of the register of said second storage area indicated by said generated address.

2. The method of claim 1 wherein said shifting is a four place shift.

3. The method of claim 1 wherein said given constant equals the base address of said first storage area minus the base address of said second storage area shifted four places to the left.

4. In a computer which stores a representation of the states of a plurality of devices and controls the devices in accordance with these states the method of locating the stored representations of a particular device having a given state comprising the steps of providing in the store of said computer a first storage area with a plurality of addressed positions wherein each position is assigned to a particular one of said devices, providing in the store of said computer a second storage area with a plurality of addressed registers each having a plurality of positions wherein each position of each register is assigned to a different group of said addressed positions of said first storage area, assigning the addressed positions of said first storage area according to a fixed relation to the addressed registers of said second storage area, said relationship including a multiplication by a multiple of the base of number system of said computer, said storage areas being so related that when a particular representation is stored in one of said addressed positions of said first storage area a related representation is stored in a related position of the addressed register of said second storage area associated with the group of said addressed positions containing said one addressed position, scanning said addressed registers by utilizing the associated addresses to determine whether any position in an addressed register is storing said related representation, upon locating such a related representation, modifying the address of the associated address register by left shifting such address by a number of digit positions associated with said multiple and adding a given constant to provide the address of the related addressed position in said first storage area.

5. The method of claim 4 wherein said second constant is equal to the base address of said second storage area minus the base address of said first storage area shifted four positions to the right.

6. In a computer which stores a representation of the states of a plurality of devices and controls the devices in accordance with their states, the method of controllably scanning for indications of the states of said devices comprising the steps of providing in the store of said computer a first storage area with a plurality of first addressed positions wherein each position is assigned to a particular one of said devices for storing a representation of the state of the device, providing in the store of said computer a second storage area with a plurality of second addressed positions wherein each second addressed position is associated with a different group of said first addressed positions, selectively recording in positions of said second storage area indicia indicating that the associated groups of said first addressed positions should be scanned to determine their states, sequentially scanning said second addressed positions for indicia until the detection of an indicium recorded in one of said second addressed position, initiating a scan of the associated group of said first addressed positions upon detection of said indicium, and continuing the scan of the remaining of said second addressed positions upon completion of the scan of said associated group.

7. A method for decreasing the work in a computer working in real time and carrying out selection and controlling functions concerning different devices, wherein each device is each defined by its identity number expressed by means of a number having $s+g_2+g_1$ binary bits where $g_1$ is a group consisting of the $n$ less significant bits, $g_2$ is a group consisting of the $n$ next more significant bits and $s$ expresses the remaining most significant bits, wherein a condition change in some of said devices is marked in the form of a binary information in at least one position corresponding to the identity number of the respective device in a memory field of the data memory of the computer which memory field is divided into words addressed by means of a word address which is the sum of the initial address of the memory field and a word index, each word comprising $m$ positions defined by a position index, and wherein the computer scans the positions corresponding to the means word-by-word in the memory field in order to determine the position which gives an indication concerning the identity of the device which is marked in order to perform said controlling functions concerning the respective devices, said method comprising the steps of dividing said memory field into a first and a second subfield each with its initial address and each further divided into words having $m=2^n$ positions, providing a relationship between the positions of said two subfields which is defined by said device identity number, the bit groups $g_1$ and $g_2$ respectively, expressing a position index in said first and second subfield respectively, and said most significant bits $s$ expressing the word index in the second subfield and the bits $s+g_2$ expressing the word index in the first subfield, upon a marking operation storing the position indices $g_1$ and $g_2$ occurring in the device identity number and the word indices $s$ and $s+g_2$ occurring in the device identity number, forming words having $m$ positions wherein the positions corresponding to the respective position index are marked, forming word addresses in the first and the second subfield respectively, by adding the word index to the initial address of the respective subfield, and inserting the formed words having $m$ positions in the respective address in the first and the second subfield, respectively, and when scanning, scanning the second subfield word-by-word, upon finding an indication in some of the positions in some of the words, storing the position index $g_2$ and word index $s$ forming from said position index and word index in the first subfield $s+g_2$, adding to the word index in the first subfield the initial address in the first subfield in order to obtain the word address in the first subfield, storing the word in said address, determining and storing the position index $g_1$ of the position indicated in the last-mentioned word and combining the word index and the position index in the first subfield with the respective device identity number.